Dec. 8, 1964
T. B. FRAME
3,160,028
BRAKE LEVER MECHANISM
Filed June 6, 1962
2 Sheets-Sheet 1
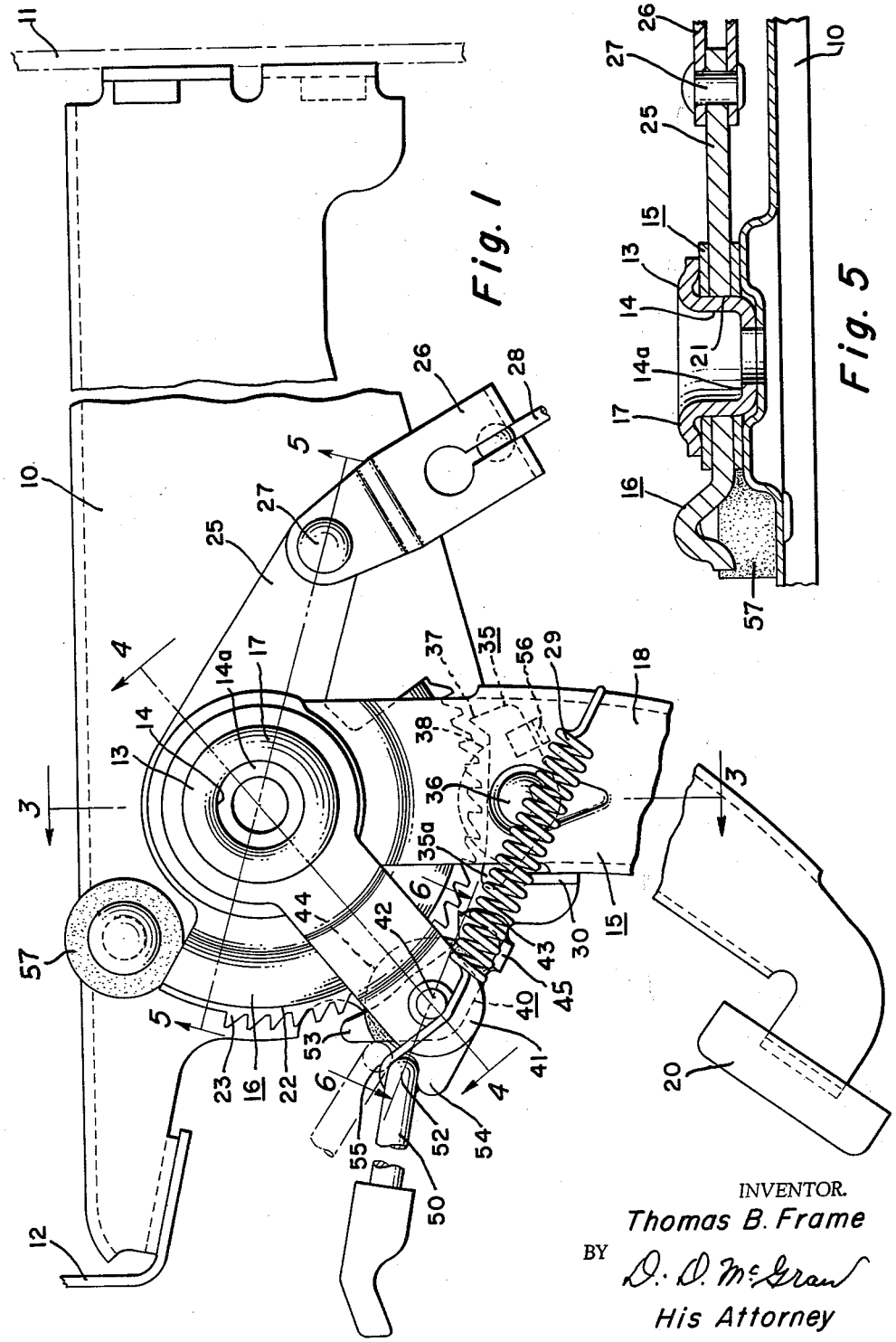
INVENTOR.
Thomas B. Frame
BY D. D. McGraw
His Attorney Dec. 8, 1964 T. B. FRAME 3,160,028
BRAKE LEVER MECHANISM
Filed June 6, 1962 2 Sheets-Sheet 2
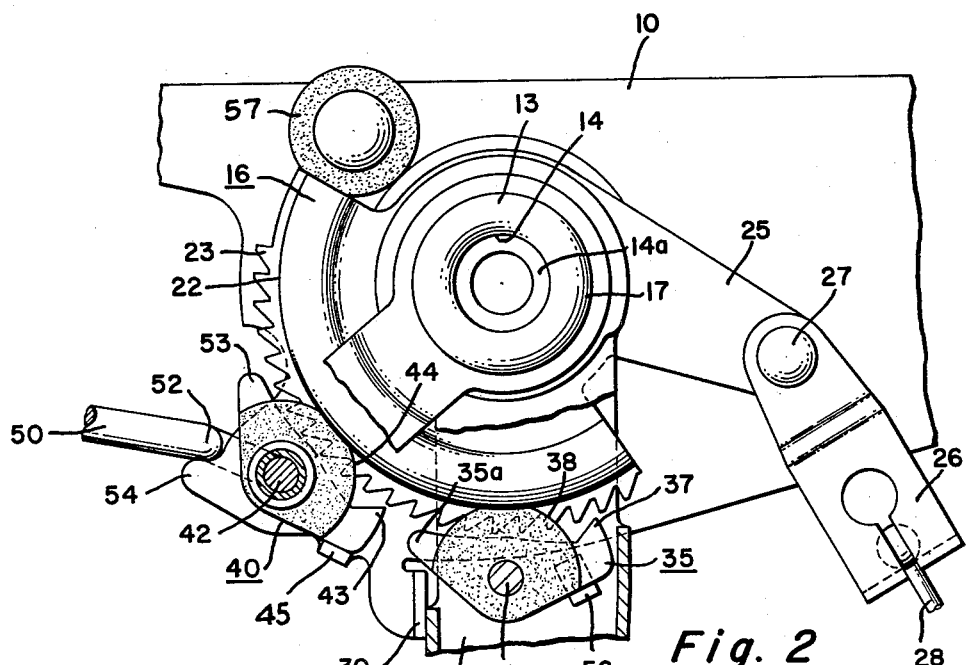
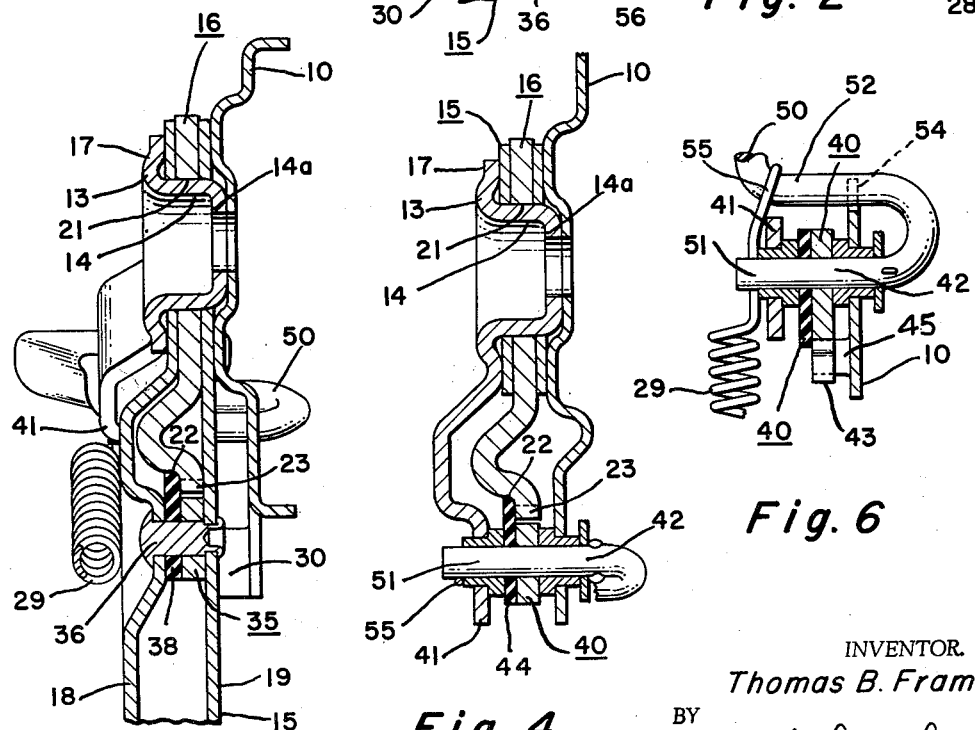
INVENTOR.
Thomas B. Frame
BY
D. D. McGraw
His Attorney

United States Patent Office 3,160,028
Patented Dec. 8, 1964

3,160,028
BRAKE LEVER MECHANISM
Thomas B. Frame, Syracuse, N.Y., assignor to General
Motors Corporation, Detroit, Mich., a corporation of
Delaware
Filed June 6, 1962, Ser. No. 200,577
12 Claims. (Cl. 74—539)

This invention relates to lever mechanisms for operating brakes on a vehicle and particularly to lever mechanisms for applying and releasing the brakes of a vehicle when using the brakes for parking of the vehicle.

Lever mechanisms for applying and releasing the brakes of a vehicle, when used as parking brakes, usually consist of a ratchet and pawl arrangement actuated manually by the operator of the vehicle so that the brakes of the vehicle will remain applied during a parking condition and held applied by the ratchet mechanism, the ratchet mechanism being released manually by the operator of the vehicle to release the brakes after the parking requirement is terminated. Such ratchet and pawl mechanisms have resulted in a clicking sound when applying or releasing the brakes of the vehicle, the pawl member moving over the ratchet teeth resulting in the clicking sound on operation of the lever mechanism.

An object of this invention is to provide a pawl and ratchet mechanism for manually applying or releasing the brakes of the vehicle during a parking requirement, but which pawl and ratchet mechanism is constructed and arranged in a manner that the pawls will not result in the usual clicking sound when operating the lever mechanism either for applying the brakes or for releasing them.

Further objects and advantages of the present invention will be apparent from the following description, reference being had to the accompanying drawings wherein preferred embodiments of the present invention are clearly shown.

In the drawings:

FIGURE 1 is a side elevational view of a brake lever mechanism incorporating features of this invention;

FIGURE 2 is a side elevational view of the brake lever mechanism similar to FIGURE 1 but with certain parts broken away to more clearly illustrate the pawl mechanism;

FIGURE 3 is a cross-sectional view taken along line 3—3 of FIGURE 1;

FIGURE 4 is a cross-sectional view taken on line 4—4 of FIGURE 1;

FIGURE 5 is a cross-sectional view taken on line 5—5 of FIGURE 1; and

FIGURE 6 is a cross-sectional view taken on line 6—6 of FIGURE 1.

In this invention the brake lever mechanism is provided with a support member 10 secured at one end to the fire wall 11 of a motor vehicle and at the opposite end to the dash panel 12 whereby to support the lever mechanism within the passenger compartment of a vehicle.

A pivot member 13 comprising a sheet metal stamping is secured to the support member 10 by any suitable means such as welding. The pivot member 13 includes a deep recessed portion 14 that is cylindrical in transverse cross section whereby to form a pivot for an actuating lever 15 and a ratchet member 16. The bottom wall 14a of the recessed pivot portion 14 is that portion which is secured to the mounting member 10 whereby the mounting member and the pivot member 13 are an integral construction. The pivot member 13 also includes the radially extending annular portion 17 that is spaced from the wall of the support member 10 whereby to retain the ratchet member 16 and the actuating lever 15 on the pivot portion 14 between the radially annular portion 17 and the mounting member 10. The actuating lever 15 and the ratchet member 16 can thus freely pivot on the member 14 as required during operation of the brake lever mechanism.

The actuating lever 15 for the operation of the ratchet member 16 is a formed sheet metal member having spaced parallel walls 18 and 19 at the lower end of which there is mounted the foot pad 20. The upper end of the actuating lever 15, and specifically the wall portions 18 and 19, have axially aligned openings in which the pivot member 14 is positioned so as to support the actuating lever 15 for free rotation on the pivot member 14.

The ratchet member 16 has an axial opening 21 that fits upon the pivot member 14 to provide for free rotation of the ratchet member 16 on the pivot. The ratchet member 16 is positioned between the parallel walls 18 and 19 of the actuating lever 15, as shown in FIGURE 3.

The ratchet member 16 includes a semicylindrical peripheral smooth wall portion 22 that is formed axially outwardly of the plane of the body of the ratchet member 16. The ratchet member also includes a semicircularly arranged toothed portion 23 in juxtaposition with the semicylindrical surface 22, the toothed portion forming the ratchet element or segment that is engaged by pawl members to operate the brake when applied by the lever 15.

The ratchet member 16 also includes a radially extending arm 25 to which there is attached a clevis 26 by means of a pivot connection 27. The clevis 26 receives one end of a brake cable 28 that extends into connection with the brake mechanism to operate the same to set the brakes for use as parking brakes when the lever 15 is moved counterclockwise as viewed in FIGURE 1. The brakes of the vehicle have the normal retraction springs for placing the brakes in retracted position after release of the parking brake apply mechanism in the conventional manner. A spring 29 returns the operating lever 15 to its retracted position as shown in FIGURE 1. The mounting member 10 has a limit stop 30 against which the lever 15 is retained when the brake apply mechanism is in the retracted position.

The brake applying mechanism includes a first pawl member 35 pivotally supported on the lever 15 by means of a pivot pin or pivot connection 36 that extends between the walls 18 and 19 of the lever 15 as shown in FIGURE 3. The pawl 35 has a tooth 37 that is engageable with the teeth of the toothed segment 23 of the ratchet member 16. Engagement of the tooth 37 with the teeth 23 of the ratchet segment is occasioned by a cylindrical friction surface 38 formed of rubber or rubberlike material that is an integral part of the pawl 35. It is apparent in FIGURES 1 and 2 that rotation of the lever 15 in a counterclockwise direction about the pivot 14 will produce counterclockwise rotation of the pawl 35 as a result of frictional engagement of the surface 38 with the cylindrical surface 22 of the ratchet member 16. This counterclockwise rotation of pawl 35 will cause tooth 37 to engage one of the teeth of the toothed segment 23 so that counterclockwise rotation of lever 15 will also rotate the ratchet segment 16 in a counterclockwise direction. Such counterclockwise rotation of ratchet member 16 will result in a pulling movement on the brake cable 28 to set the brakes of the vehicle for parking.

To hold the ratchet member 16 in position to retain the brakes set for parking, a second pawl 40 is pivotally supported on an extension arm 41 by a pivot connection 42, the arm 41 being integral with the member 13 and stationary with the mounting member 10.

The second pawl 40 has a tooth 43 engageable with the teeth of the toothed segment 23 of ratchet member 16. This pawl 40 also has a semicylindrical friction surface 44 of rubber or rubber-like material comparable to the friction surface 38 of the pawl 35 so that the pawl 40 will be rotated on its pivot by relative rotation between the ratchet segment 16 and the support member 10.

When the apply lever 15 is moved in a counterclockwise direction as previously described and pawl 35 has its tooth engaging the ratchet segment 23 to rotate the ratchet member 16 in a counterclockwise direction, the friction engagement between the friction surface 44 of pawl 40 and the cylindrical surface 22 of the ratchet segment 16 will urge the pawl 40 in a clockwise direction to retain the tooth 43 out of engagement with the teeth of the toothed segment 23. When the tooth 43 moves against the stop 45, further rotation of the pawl 40 is prevented but the cylindrical surface 22 of the ratchet segment 16 will slide over the friction surface 44 of pawl 40 so that there can still be relative movement between the ratchet member 16 and the pawl 40 during the entire movement of lever 15 in applying the brake mechanism to a park condition. However, the tooth 43 will be retained out of engagement with the toothed section 23 of the ratchet member 16 so that there will be no clicking sound resulting from relative movement between the ratchet member 16 and the pawl 40 during the apply period of the brakes of the vehicle.

When the vehicle brakes have been applied by forward movement or counterclockwise movement of lever 15 about its pivot and the operator of the vehicle removes his foot from the pedal 20, there will be a clockwise rotation of the ratchet member 16 about its pivot resulting from the normal retraction springs of the brake system pulling on cable 28. This clockwise rotation of the member 16 will cause counterclockwise rotation of the pawl 40 so that the tooth 43 will immediately engage one of the teeth of the toothed section 23 of the ratchet member 16 and prevent release or retraction of the brakes of the vehicle. Thus, pawl 40 will hold the ratchet 16 and the integral radial arm 25 in the apply position when the foot of the operator is removed from the pedal 20. The lever 15 is free to rotate about pivot 14 separately from ratchet 16. Therefore, each time the operator's foot is removed from the pedal 20, lever 15 is retracted by spring 29 until it engages stop 30. Thus lever 15 may be operated repeatedly in a counterclockwise direction, as viewed in FIGURE 1, to increase tension in cable 28 without manually releasing pawl 40 from engagement with toothed segment 23.

When the lever 15 approaches its retracted position against stop 30, as shown in FIGURE 1, the end portion 35a of pawl 35 engages the stop to effect positive disengagement of the tooth 37 of pawl 35 from the toothed segment 23 of the ratchet mechanism. The retraction springs in the brake system can then fully and completely retract the brake shoes from the brake drum and place them in their normal retracted position without any interference from the brake apply mechanism when member 50 is actuated in a clockwise movement, as viewed in FIGURE 1, to release segment 16. Counterclockwise rotation of pawl 35 is limited by the stop 56 provided on lever 15.

To release the lever mechanism and allow the brakes of the vehicle to release when it is desired to terminate a parking situation, the hand or manually operated member 50 is actuated by the operator of the vehicle, moving the member 50 in a clockwise or upward movement as viewed in FIGURES 1 and 2.

The release member 50 has a U-shaped forward end, as shown in FIGURE 6, with the forward leg 51 being pivotally supported in the projection 41 and also providing the pivot 42 for the pawl 40. The rearward leg 52 of the member 50 is engageable with the end portion 53 of pawl 40 when member 50 is moved in a clockwise direction about its pivot 42 so as to effect release of the tooth 43 of pawl 40 from the toothed segment 23. Normally the release member 50 is held against a stop 54 by means of a spring 55.

On release of the pawl 40 from the toothed segment 23, the retraction springs of the brake system urge the ratchet member 16 in a clockwise direction, as viewed in FIGURE 1, to engage the rubber or rubber-like stop 57, with pawls 35 and 43 disengaged from the ratchet teeth of the segment 23. Thus, there will be no clicking sound created during the release movement of the mechanism.

While the embodiments of the present invention as herein disclosed constitute preferred forms, it is to be understood that other forms might be adopted.

What is claimed is as follows:

1. A brake lever mechanism, comprising in combination, a stationary mounting member, a ratchet member having a peripheral generally semicircular surface and a toothed generally semicircular segment, an actuating lever, pivot means rotatably supporting said ratchet member and said lever on said mounting member, a first pawl on said lever including pivot support means for same, said first pawl having a tooth engageable with said toothed segment and a friction surface engaging said semi-circular surface for rotation of said first pawl on movement of said lever, a second pawl on said mounting member including pivot support means for the same, said second pawl having a tooth engageable with said toothed segment and a friction surface engaging said semicircular surface for rotation of said second pawl on movement of said lever, and means engageable with said second pawl to effect disengagement thereof with said toothed segment independently of movement of said lever.

2. A brake lever mechanism, comprising in combination, a stationary mounting member, a ratchet member having a peripheral generally semicircular surface and a toothed generally semicircular segment, an actuating lever, pivot means rotatably supporting said ratchet member and said lever on said mounting member, a first pawl on said lever including pivot support means for same, said first pawl having a tooth engageable with said toothed segment and a friction surface engaging said semi-circular surface for rotation of said first pawl into engagement with said toothed segment to rotate said ratchet member on movement of said lever in one direction of movement, a second pawl on said mounting member including pivot support means for the same, said second pawl having a tooth engageable with said toothed segment and a friction surface engaging said semicircular surface for rotation of said second pawl out of engagement with said toothed segment on movement of said lever in said one direction, and means engageable with said second pawl to effect disengagement thereof with said toothed segment.

3. A brake lever mechanism, comprising in combination, a stationary mounting member, a ratchet member having a peripheral generally semicircular surface and a toothed generally semicircular segment, an actuating lever, pivot means rotatably supporting said ratchet member and said lever on said mounting member, a first pawl on said lever including pivot support means for same, said first pawl having a tooth engageable with said toothed segment and a friction surface engaging said semicircular surface for rotation of said first pawl into engagement with said toothed segment to rotate said ratchet member on movement of said lever in one direction of movement and out of engagement therewith on reverse movement of said lever, a second pawl on said mounting member including pivot support means for the same, said second pawl having a tooth engageable with said toothed segment and a friction surface engaging said semicircular surface for rotation of said second pawl out of engagement with said toothed segment on movement of said lever in said one direction and into engagement therewith on said reverse movement of said lever, and means engageable with said second pawl to effect disengagement thereof with said toothed segment.

4. A brake lever mechanism, comprising in combination, a stationary mounting member, a ratchet member having a peripheral generally semicircular surface and a toothed generally semicircular segment, an actuating lever, pivot means rotatably supporting said ratchet member and said lever on said mounting member, a first pawl on said lever including pivot support means for same, said first pawl having a tooth engageable with said toothed segment and a friction surface engaging said semicircular surface for rotation of said first pawl into engagement with said toothed segment to rotate said ratchet member on movement of said lever in one direction of movement and out of engagement therewith on reverse movement of said lever, a second pawl on said mounting member including pivot support means for the same, said second pawl having a tooth engageable with said toothed segment and a friction surface engaging said semicircular surface for rotation of said second pawl out of engagement with said toothed segment on movement of said lever in said one direction and into engagement therewith on said reverse movement of said lever, and means engageable with said second pawl to effect disengagement thereof with said toothed segment.

5. A brake lever mechanism, comprising in combination, a stationary mounting member, a ratchet member having a generally semicircular surface and a toothed generally semicircular segment, an actuating lever for rotating said ratchet member, pivot means supporting said member and lever on said mounting member for rotation thereon, means normally urging said ratchet member in one direction of rotation, a first pawl rotatably supported on said lever having a tooth engageable with said segment and a friction surface engaging said semicircular surface and rotatable thereby on relative movement between said lever and said segment, a second pawl rotatably supported on said mounting member having a tooth engageable with said segment and a friction surface engaging said semicircular surface and rotatable thereon on relative movement between said segment and said mounting member, and means engageable with said second pawl to effect disengagement thereof with said toothed segment.

6. A brake lever mechanism, comprising in combination, a stationary mounting member, a ratchet member having a generally semicircular surface and a toothed generally semicircular segment, an actuating lever for rotating said ratchet member, pivot means supporting said member and lever on said mounting member for rotation thereon, means normally urging said ratchet member in one direction of rotation, a first pawl rotatably supported on said lever having a tooth engageable with said segment and a friction surface engaging said semicircular surface and rotatable thereby to effect engagement of said first pawl with said segment on relative movement between said lever and said segment on movement of said lever in one direction and disengagement of said first pawl with said segment on relative movement in an opposite direction, a second pawl rotatably supported on said mounting member having a tooth engageable with said segment and a friction surface engaging said semicircular surface and rotatable thereby to effect engagement of said second pawl with said segment on relative movement between said segment and said mounting member in said opposite direction and effect disengagement on relative movement in said one direction, and means engageable with said second pawl to effect disengagement thereof with said toothed segment.

7. A brake lever mechanism, comprising in combination, a stationary mounting member, a ratchet member having a generally semicircular surface and a toothed generally semicircular segment, an actuating lever for rotating said ratchet member, pivot means supporting said member and lever on said mounting member for rotation thereon, means normally urging said ratchet member in one direction of rotation, a first pawl rotatably supported on said lever having a tooth engageable with said segment and a friction surface engaging said semicircular surface and rotatable thereby to effect engagement of said first pawl with said segment on relative movement between said lever and said segment on movement of said lever in one direction and disengagement of said first pawl with said segment on relative movement in an opposite direction, a second pawl rotatably supported on said mounting member having a tooth engageable with said segment and a friction surface engaging said semicircular surface and rotatable thereby to effect engagement of said second pawl with said segment on relative movement between said segment and said mounting member in said opposite direction and effect disengagement on relative movement in said one direction, and manually operated means engageable with said second pawl to manually effect disengagement of said pawl with said segment.

8. A brake lever mechanism, comprising in combination, a stationary mounting member, a ratchet member having a semicylindrical surface and a toothed semicircular peripheral segment in juxtaposition with said surface, an actuating lever for rotating said ratchet member, pivot means supporting said member and lever on said mounting member for rotation thereon, means normally urging said ratchet member in one direction of rotation to a normally retracted position of the brake lever mechanism, a first pawl rotatably supported on said lever having a tooth engageable with said segment and a semicylindrical friction surface engaging said semicylindrical surface of said ratchet member, said first pawl being rotatable by said friction surface of said first pawl on relative movement between said lever and said segment to effect engagement of said first pawl with said segment on movement of said lever in one direction and effect disengagement of said first pawl on relative movement between said lever and said segment in an opposite direction, a second pawl rotatably supported on said mounting member having a tooth engageable with said segment and a semicylindrical friction surface engaging said semicylindrical surface of said ratchet member, said second pawl being rotatable by said friction surface thereon on relative movement between said ratchet member and said mounting member to effect disengagement of said second pawl from said segment on movement of said ratchet member and lever in said one direction and to effect engagement of said second pawl with said segment on movement of said segment in the opposite direction, and means engageable with said second pawl to effect disengagement thereof with said toothed segment.

9. A brake lever mechanism, comprising in combination, a stationary mounting member, a ratchet member having a semicylindrical surface and a toothed semicircular peripheral segment in juxtaposition with said surface, an actuating lever for rotating said ratchet member, pivot means supporting said member and lever on said mounting member for rotation thereon, means normally urging said ratchet member in one direction of rotation to a normally retracted position of the brake lever mechanism, a first pawl rotatably supported on said lever having a tooth engageable with said segment and a semicylindrical friction surface engaging said semicylindrical surface of said ratchet member, said first pawl being rotatable by said friction surface of said first pawl on relative movement between said lever and said segment to effect engagement of said first pawl with said segment on movement of said lever in one direction and effect disengagement of said first pawl on relative movement between said lever and said segment in an opposite direction, and a second pawl rotatably supported on said mounting member having a tooth engageable with said segment and a semicylindrical friction surface engaging said semicylindrical surface of said ratchet member, said second pawl being rotatable by said friction surface thereon on relative movement between said ratchet member and said mounting member to effect disengagement of said second pawl from said segment on movement of said ratchet member and lever in said one direction and to effect engagement of said second pawl with said segment on movement of said segment in the opposite direction, and release means engageable with said second pawl to effect disengagement thereof with said segment to provide for said opposite rotation of said segment relative to said mounting member.

10. A brake lever mechanism, comprising in combination, a stationary mounting member, a ratchet member having a semicylindrical surface and a toothed semicircular peripheral segment in juxtaposition with said surface, an actuating lever for rotating said ratchet member, pivot means supporting said member and lever on said mounting member for rotation thereon, means normally urging said ratchet member in one direction of rotation to a normally retracted position of the brake lever mechanism, a first pawl rotatably supported on said lever having a tooth engageable with said segment and a semicylindrical friction surface engaging said semicylindrical surface of said ratchet member, said first pawl being rotatable by said friction surface of said first pawl on relative movement between said lever and said segment to effect engagement of said first pawl with said segment on movement of said lever in one direction and effect disengagement of said first pawl on relative movement between said lever and said segment in an opposite direction, and a second pawl rotatably supported on said mounting member having a tooth engageable with said segment and a semicylindrical friction surface engaging said semicylindrical surface of said ratchet member, said second pawl being rotatable by said friction surface thereon on relative movement between said ratchet member and said mounting member to effect disengagement of said second pawl from said segment on movement of said ratchet member and lever in said one direction and to effect engagement of said second pawl with said segment on movement of said segment in the opposite direction, and release means engageable with said second pawl to effect disengagement thereof with said segment to provide for said opposite rotation of said segment relative to said mounting member, and means engaged by said first pawl in the manual retracted position of said lever to effect disengagement of said first pawl with said segment.

11. A brake lever mechanism, comprising in combination, a stationary mounting member, a ratchet member having a semicylindrical surface and a toothed semicircular peripheral segment in juxtaposition with said surface, an actuating lever for rotating said ratchet member, pivot means supporting said member and lever on said mounting member for rotation thereon, means normally urging said ratchet member in one direction of rotation to a normally retracted position of the brake lever mechanism, a first pawl rotatably supported on said lever having a tooth engageable with said segment and a semicylindrical friction surface engaging said semicylindrical surface of said ratchet member, said first pawl being rotatable by said friction surface of said first pawl on relative movement between said lever and said segment to effect engagement of said first pawl with said segment on movement of said lever in one direction and effect disengagement of said first pawl on relative movement between said lever and said segment in an opposite direction, and a second pawl rotatably supported on said mounting member having a tooth engageable with said segment and a semicylindrical friction surface engaging said semicylindrical surface of said ratchet member, said second pawl being rotatable by said friction surface thereon on relative movement between said ratchet member and said mounting member to effect disengagement of said second pawl from said segment on movement of said ratchet member and lever in said one direction and to effect engagement of said second pawl with said segment on movement of said segment in the opposite direction, means on said mounting member and said lever respectively limiting disengagement rotation of said second and first pawls respectively, and means engageable with said second pawl to effect disengagement thereof with said toothed segment.

12. A brake lever mechanism, comprising in combination, a stationary mounting member, a ratchet member having a peripheral generally semicircular surface and a toothed generally semicircular segment, an actuating lever movable in arcuately opposite directions, pivot means rotatably supporting said ratchet member and said actuating lever on said mounting member, a first pawl member on said actuating lever including pivot support means for same, said first pawl member having a tooth engageable with said toothed segment and a friction surface engaging said semicircular surface for rotation of said first pawl member to engage said first pawl tooth and said toothed segment on movement of said actuating lever in one arcuate direction and disengage the same on movement of said actuating lever in the opposite arcuate direction, a second pawl member on said mounting member including pivot support means for same, said second pawl member having a tooth engageable with said toothed segment and a friction surface engaging said semicircular surface for rotation of said second pawl member to disengage said second pawl tooth and said toothed segment on movement of said actuating lever in the one arcuate direction and engage the same on movement of said actuating lever in the opposite arcuate direction, and release means for disengaging said second pawl tooth and said toothed segment independently of movement of said actuating lever.

References Cited in the file of this patent

UNITED STATES PATENTS

| | | |
|---|---|---|
| 164,413 | Barnes | June 15, 1875 |
| 2,507,997 | Roedding et al. | May 16, 1950 |
| 2,905,024 | McCarthy et al. | Sept. 22, 1959 |
| 3,002,394 | Spisz | Oct. 3, 1961 |